(12) United States Patent
Duesing et al.

(10) Patent No.: US 10,330,319 B2
(45) Date of Patent: Jun. 25, 2019

(54) SEQUENTIAL COMBUSTION WITH DILUTION GAS MIXER

(71) Applicant: ANSALDO ENERGIA SWITZERLAND AG, Baden (CH)

(72) Inventors: Michael Duesing, Rheinfelden (DE); Luis Tay Wo Chong Hilares, Neuenhof (CH); Mirko Ruben Bothien, Zürich (CH); Jaan Hellat, Zumikon (CH); Bruno Schuermans, La Tour de Peilz (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 339 days.

(21) Appl. No.: 14/693,045

(22) Filed: Apr. 22, 2015

(65) Prior Publication Data

US 2015/0226122 A1 Aug. 13, 2015

Related U.S. Application Data

(63) Continuation of application No. PCT/EP2013/058650, filed on Apr. 25, 2013.

(30) Foreign Application Priority Data

Oct. 24, 2012 (EP) .................................. 12189685

(51) Int. Cl.
*F23R 3/34* (2006.01)
*F23C 6/04* (2006.01)
(Continued)

(52) U.S. Cl.
CPC .................. *F23R 3/06* (2013.01); *F02C 6/02* (2013.01); *F23M 20/005* (2015.01); *F23R 3/002* (2013.01);
(Continued)

(58) Field of Classification Search
CPC .... F23R 3/34; F23R 3/346; F23R 3/06; F23R 2900/03341; F23R 3/08
See application file for complete search history.

(56) References Cited

U.S. PATENT DOCUMENTS 4,173,118 A * 11/1979 Kawaguchi ............... F23C 3/00
431/352
4,590,769 A * 5/1986 Lohmann ................. F23R 3/045
60/752

(Continued)

FOREIGN PATENT DOCUMENTS

CA 2832493 A1 10/2012
DE 102 14 574 A1 10/2003
(Continued)

OTHER PUBLICATIONS

Office Action (Notification of Reasons for Refusal) dated Apr. 10, 2017, by the Japanese Patent Office in corresponding Japanese Patent Application No. 2015-238332, and an English translation thereof. (13 pgs).

(Continued)

*Primary Examiner* — Gerald L Sung
*Assistant Examiner* — Rene D Ford
(74) *Attorney, Agent, or Firm* — Buchanan Ingersoll & Rooney PC (57) ABSTRACT

The invention refers to a sequential combustor arrangement including a first burner, a first combustion chamber, a mixer for admixing a dilution gas to the hot gases leaving the first combustion chamber during operation, a second burner, and a second combustion chamber arranged sequentially in a fluid flow connection. The mixer includes a plurality of injection pipes pointing inwards from the side walls of the mixer for admixing the dilution gas to cool the hot flue gases leaving the first combustion chamber with a low pressure (Continued)

drop. The disclosure further refers to a method for operating a gas turbine with such a combustor arrangement.

14 Claims, 6 Drawing Sheets

(51) Int. Cl.
    *F23R 3/06* (2006.01)
    *F02C 6/02* (2006.01)
    *F23R 3/00* (2006.01)
    *F23M 20/00* (2014.01)

(52) U.S. Cl.
    CPC ...... *F05D 2220/32* (2013.01); *F05D 2240/35* (2013.01); *F05D 2260/964* (2013.01); *F23R 2900/00014* (2013.01); *F23R 2900/03341* (2013.01); *Y02E 20/16* (2013.01)

(56) References Cited

U.S. PATENT DOCUMENTS

| | | | |
|---|---|---|---|
| 5,211,536 A * | 5/1993 | Ackerman | F01D 9/042 415/177 |
| 5,431,018 A | 7/1995 | Keller | |
| 5,577,378 A | 11/1996 | Althaus et al. | |
| 5,645,410 A * | 7/1997 | Brostmeyer | F23C 6/047 431/10 |
| 7,007,482 B2 * | 3/2006 | Green | F01D 9/023 60/39.37 |
| 8,057,224 B2 * | 11/2011 | Knoepfel | F23D 17/002 431/10 |
| 2004/0083737 A1 | 5/2004 | Wright | |
| 2009/0003998 A1 | 1/2009 | Woodcock et al. | |
| 2010/0162712 A1 * | 7/2010 | Zupanc | F23R 3/06 60/747 |
| 2010/0218503 A1 * | 9/2010 | Bronson | F23R 3/06 60/754 |
| 2011/0265484 A1 | 11/2011 | Huber et al. | |
| 2011/0302924 A1 | 12/2011 | Lee et al. | |
| 2012/0036859 A1 | 2/2012 | Johnson et al. | |
| 2012/0186262 A1 * | 7/2012 | Hoke | F23R 3/06 60/772 |
| 2012/0228050 A1 | 9/2012 | Bulat | |
| 2012/0297778 A1 * | 11/2012 | Rudrapatna | F23R 3/045 60/755 |
| 2014/0033728 A1 | 2/2014 | Marmilic et al. | |
| 2015/0159876 A1 | 6/2015 | Freitag et al. | |

FOREIGN PATENT DOCUMENTS

| | | |
|---|---|---|
| DE | 103 12 971 A1 | 12/2004 |
| DE | 10 2011 012 414 A1 | 8/2012 |
| EP | 0 694 740 A2 | 1/1996 |
| EP | 2 224 170 A2 | 9/2010 |
| EP | 2 397 759 A1 | 12/2011 |
| FR | 2 222 124 A1 | 10/1974 |
| JP | 6121011 A | 2/1976 |
| WO | 2012/136787 A1 | 10/2012 |
| WO | 2014/029512 A2 | 2/2014 |

OTHER PUBLICATIONS

Examination Report dated Mar. 29, 2017, by the Patent Office of the Cooperation Council for the Arab States of the Gulf in corresponding Arab Patent Application No. GC 2013-25577 and an English translation thereof. (4 pgs).
Office Action (Communication pursuant to Article 94(3) EPC) dated Jun. 28, 2017 by the European Patent Office in corresponding European Patent Application No. 13 721 300.5-1605. (8 pages).

* cited by examiner

SEQUENTIAL COMBUSTION WITH DILUTION GAS MIXER

CROSS-REFERENCE TO RELATED APPLICATIONS

This application claims priority to PCT/EP2013/058650 filed Apr. 25, 2013, which claims priority to European application 12189685.6 filed Oct. 24, 2012, both of which are hereby incorporated in their entireties.

TECHNICAL FIELD

The invention refers to a sequential combustor arrangement for a gas turbine with admixing dilution gas into the combustor arrangement. The invention additionally refers to a method for operating a gas turbine with admixing dilution gas into a combustor arrangement.

BACKGROUND

Due to increased power generation by unsteady renewable sources like wind or solar existing gas turbine based power plants are increasingly used to balance power demand and to stabilize the grid. Thus improved operational flexibility is required. This implies that gas turbines are often operated at lower load than the base load design point, i.e. at lower combustor inlet and firing temperatures.

At the same time, emission limit values and overall emission permits are becoming more stringent, so that it is required to operate at lower emission values, keep low emissions also at part load operation and during transients, as these also count for cumulative emission limits.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements.

To further reduce emissions and operational flexibility sequential combustion has been suggested in DE 10312971 A1. Depending on the operating conditions, in particular on the hot gas temperature of a first combustion chamber it can be necessary to cool the hot gases before they are admitted to a second burner (also called sequential burner). This cooling can be advantageous to allow fuel injection and premixing of the injected fuel with the hot flue gases of the first combustor in the second burner.

Conventional cooling methods either require heat exchanger structures which lead to high pressure drops in the main hog gas flow or suggest injection of a cooling medium from the side walls. For injection of a cooling medium from the side walls a high pressure drop is required which is detrimental to the efficiency of a gas turbine operated with such a combustor arrangement and a controlled cooling of the whole flow is difficult.

SUMMARY

The object of the present disclosure is to propose a sequential combustor arrangement with a mixing section for dilution gas admixing between the first combustion chamber and the second burner. The dilution gas is admixed in the mixing section to provide proper inlet flow conditions for the second burner. In particular the hot gases are cooled.

High inlet temperatures may result in high emissions (in particular NOx, CO, and unburned hydrocarbons) and/or flashback in the second burner. Flashback and NOx are induced by the reduced self-ignition time for the injected fuel due to a high inlet gas temperature or high oxygen concentration, which causes earlier ignition (leading to flashback) or reduced time for fuel air mixing resulting in local hot spots during combustion and consequently increases NOx emission. Low temperature regions can cause CO emissions, due to the increased self-ignition time. This can reduce the time for CO to CO2 burnout, and a reduced local flame temperature, which is can further slowdown the CO to CO2 burnout. Finally local hot spots may lead to overheating of certain parts downstream of the mixer.

A sequential combustor arrangement according to the disclosure comprises a first burner, a first combustion chamber, a mixing device for admixing a dilution gas to the hot gases leaving the first combustion chamber during operation, a second burner, and a second combustion chamber arranged sequentially in a fluid flow connection, wherein the mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner.

A local high oxygen concentration can have a similar effect as a local high temperature, e.g. fast reaction reducing the time for mixing, high combustion temperatures, increased NOx emissions and possibly flash back. A local low oxygen concentration can have a similar effect as a local low temperature, e.g. slow reaction leading to increased CO and UHC (unburned hydrocarbon) emissions.

A high or low local inlet velocity can lead to increased or reduced residence time in the second burner and subsequent second combustion chamber, which has similar negative effects as inhomogeneous self-ignition times, e.g. a reduced residence time in the second burner can lead to incomplete mixing and high NOx. A reduced residence time in the second combustor can lead to incomplete combustion resulting in increased CO emissions. A reduced flow velocity in the second burner can lead to early ignition and flash back.

Further important requirements from the aerodynamic point of view are minimised pressure loss in the hot gas path and the dilution gas supply. Both can impact the performance of a gas turbine operating with such a combustor arrangement.

According to a first embodiment the mixer comprises a plurality of injection pipes, which are pointing inwards from the walls of the duct for admixing the dilution gas to cool the hot flue gases leaving the first combustion chamber to provide appropriate inlet conditions to the second burner.

The diameter, length and number of these pipes are designed to admix dilution gas into the hot gas flow such that the required local mass flow and temperature drop are achieved with a low pressure drop. Typically the injection pipes allow admixing of dilution gas with a pressure drop of 0.4% to 2% of the total pressure of the dilution gas pressure before admixing. With a low pressure drop at the inlet of the injector pipes, a pressure drop of 0.2% to 1% of the total pressure of the dilution gas pressure before admixing can be sufficient. To reduce the inlet pressure drop rounded pipe inlets can be used.

According to an embodiment the combustor arrangement comprises first injection pipes having a first intrusion depth into the hot gas flow normal to the side wall, and second injection pipes having a second intrusion depth normal to the side wall. The intrusion depth of the second injection pipes can be smaller than the intrusion depth of the first injection pipes.

For pipes arranged normal to the side wall the length of the pipes extending into the hot gas path is equal to the intrusion depth.

According to a further embodiment the ratio of the intrusion depth of the first injection pipe to the intrusion depth of the second injection pipe is greater than 2. In yet another embodiment the ratio of the intrusion depth of the first injection pipe to the intrusion depth of the second injection pipe is greater than 3.

According to yet another embodiment at least a third injection pipe with a length between the length of the first and second injection pipe is arranged in the mixer. The third injection pipes can for example be arranged upstream or downstream of the first injection pipes and have a length of 60% to 80% of the first injection pipe.

According to one embodiment the ratio of equivalent diameter of the cross section of the flow path at the location of the first injection pipes in the mixer to the intrusion depth of the first injection pipes is in the range of 2.5 to 8. In yet another embodiment the ratio of equivalent diameter of the cross section of the flow path at the location of the first injection pipes in the mixer to the intrusion depth of the first injection pipes is in a range of 3 to 6. For mixers in a can architecture the equivalent diameter is the diameter of a circular duct or pipe that gives the same cross sectional area as the area of the flow duct. For mixers in an annular architecture the equivalent diameter is the height of the annular duct (i.e. the outer radium minus the inner radius).

According to one embodiment the ratio of the length of the second injection pipe to the diameter of the second injection pipe is smaller than 1/4. With this embodiment dilution gas can be admixed close to the side walls with minimum pressure loss. This short pipe allows penetration of the admixed dilution gas beyond the boundary layer of the side walls and admixing into the main flow.

According to a further embodiment the mixer comprises first injection pipes and injection holes arranged along the side wall. The first injection pipes are arranged to admix dilution gas towards the central region of the hot gas flow path and the injection holes are arranged to admix dilution gas into the wall regions of the hot gas flow path.

To minimize the pressure drop in the hot gas flow path it can be advantageous to arrange the second injection pipes or injection holes close to the first injection pipes. The dilution gas injected from the second injection pipes or injection holes close to the first injection pipe can reduce the pressure drop. In particular the second injection pipes or injection holes can be arranged downstream of first injection pipes or vice versa, i.e. the first injection pipes or holes can be arranged downstream of the second injection pipes or injection holes. If the second injection pipe is arranged downstream of the first injection pipe it can compensate for the wake of the first injection pipes thus reducing the pressure loss due to the first injection pipes. If the second injection pipe is arranged upstream of the first injection pipe the flow velocity in the vicinity of the first injection pipe is reduced due to the wake of the second injection pipe and the injected dilution air of the second injection pipe thus also reducing the pressure drop.

According to a further embodiment the distance in flow direction of the hot gases between first injection pipe and second injection pipe, respectively injection holes, is less than three times the diameter of the first injection pipe preferably less than two and a half times the diameter of the first injection pipes. The short distance reduces the overall length of the mixer and allows effective injection into the wake.

According to one embodiment the pipes of one length, e.g. the first injection pipes, are arranged circumferentially distributed along the wall of the mixer in one plane normal to the main flow direction of the hot gases flowing through the mixer.

According to a further embodiment the pipes are arranged circumferentially distributed along the wall of the mixer and staggered relative to a plane normal to the main flow direction of the hot gases flowing through the mixer. The stagger reduces the blockage of the pipes extending into the hot gas flow path. To keep the mixer length short the stagger can be smaller than half the pipe diameter. To effectively reduce the blockage the stagger should preferably be more than 10% of the pipe diameter, and more preferably more than 25% of the pipe diameter.

The pipes of the mixer are exposed to the hot gases leaving the first combustion chamber. The pipes are inherently cooled by the dilution gas which is flowing through them. However, to increase life time of the pipes additional measures to reduce the temperature of the pipes can be applied.

In one embodiment the heat transfer coefficient on the inside of the pipe is increased. For increased heat transfer cooling ribs and/or a pin field can be arranged on the inner surface of the injection pipes.

In another embodiment the outer surface of the pipe is coated with thermal barrier coating (TBC). In a further embodiment thermal barrier coating is applied on the leading edge region of the pipe. This can for example be a region of +/−45° from the leading edge. In combination with TBC or as an alternative to TBC diffusion cooling holes can be applied on the pipe such that part of the dilution gas discharges through the cooling holes and thereby reduces the thermal load of the pipe walls. Preferably the diffusion cooling holes are arranged on the downstream side of the pipe. The dilution gas can be injected with a low pressure difference relative to the total pressure of the hot gases. Therefore an injection at the leading edge might not be possible. Additionally, by diffusion cooling of the downstream side the negative effect of the pipes wake on the mixer pressure drop can be at least partly mitigated.

One of the objects of the present disclosure is to provide a mixer which allows admixing of dilution gas with a low pressure drop in the hot gas flow path. To reduce the pressure drop a low flow velocity is expedient. According to one embodiment the mixer of the combustor arrangement comprises a diffusor section upstream of the dilution gas admixing to reduce the flow velocity of the hot gases. Alternatively or in addition the mixer comprises a diffusor section in the region of the dilution gas admixing to increase the flow area as the volume flow increases due to the admixing of dilution gas. The increase in flow area can have the same ratio as the volume flow increase to keep the axial flow velocity constant. In a further embodiment the increase in flow area is chosen such that the increase in the average axial velocity stays within 20% of the axial velocity upstream of the admixing location.

In a further embodiment the injection pipes are inclined at an angle of less than 90° relative to the flow direction of the hot gases such that the dilution gas leaving the pipes have a flow component in the direction of the hot gas flow at the location of injection.

Preferably the injection pipes are inclined at an angle such that the axial component of the dilution gas leaving the pipes is equal to or within +/−50% of the axial flow velocity of the hot gas flow at the location of injection.

Besides the combustor arrangement a gas turbine comprising such a combustor arrangement is subject of the present disclosure. Such a gas turbine comprises at least a compressor, a combustor arrangement with a first burner, a first combustion chamber, a mixing device for admixing a dilution gas to the hot gases leaving the first combustion chamber during operation, a second burner, and a second combustion chamber arranged sequentially in fluid flow connection, wherein the mixer is adapted to guide combustion gases in a hot gas flow path extending between the first combustion chamber and the second burner comprising a duct having an inlet at an upstream end adapted for connection to the first combustion chamber and an outlet at a downstream end adapted for connection to the second burner, and a turbine. The mixer comprises a plurality of injection pipes pointing inwards from the side walls of the duct for admixing the dilution gas to cool the hot flue gases leaving the first combustion chamber during operation. The mixer is arranged such that the dilution gas is admixed during operation to cool the hot gases.

Besides the gas turbine a method for operating such a gas turbine is subject of the present disclosure. Dilution gas can be admixed to the hot gases in the mixer such that the hot gases are cooled. According to one embodiment dilution gas is injected through holes and/or injection pipes with different lengths in order to introduce dilution gas in different regions of the cross section of the mixer. In one embodiment the first injection pipes are arranged to admix dilution gas towards the central region of the hot gas flow path and the second injection pipes or injection holes are arranged to admix dilution gas into the wall regions of the hot gas flow path.

Effusion cooling might be used to cool the combustor walls and/or side walls of the mixing section.

Downstream of the dilution air injection mixing between dilution air and hot gas can be enhanced by a contraction of the flow path.

Referring to a sequential combustion the combination of combustors can be disposed as follows:
 Both, the first and second combustors are configured as sequential can-can architecture.
 The first combustor is configured as an annular combustion chamber and the second combustor is configured as a can configuration.
 The first combustor is configured as a can-architecture and the secondary combustor is configured as an annular combustion chamber.
 Both, the first and second combustor are configured as annular combustion chambers.

BRIEF DESCRIPTION OF THE DRAWINGS

The disclosure, its nature as well as its advantages, shall be described in more detail below with the aid of the accompanying drawings. Referring to the drawings:

FIG. 2c shows a mixer with first injection pipes and injection holes and diverging mixer side walls;

DETAILED DESCRIPTION

Figure 1A:
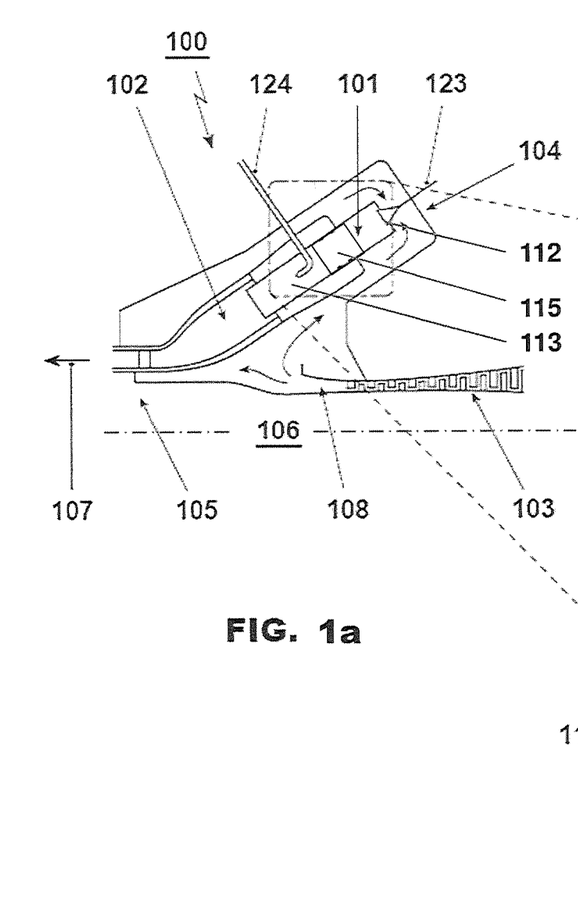
FIGS. 1a, b, c and d show a generic gas turbine using sequential combustion with a mixer for admixing dilution gas.
Figure 1B:
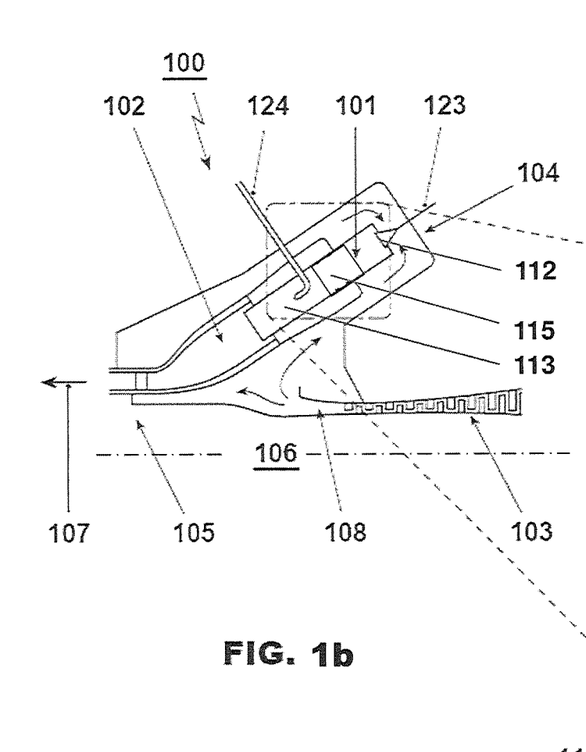

FIG. 1a, b, c, and d show a gas turbine 100 with a sequential combustor arrangement 104 according to the disclosure. It comprises a compressor 103, a combustor arrangement 104, and a turbine 105. The combustor arrangement 104 comprises a first burner 112, a first combustion chamber 101, and a mixer 117 for admixing a dilution gas to the hot gases leaving the first combustion chamber 101 during operation. Downstream of the mixer 117 the combustor arrangement 104 further comprises a second burner 113, and a second combustion chamber 102. The first burner 112, first combustion chamber 101, mixer 117, second burner 113 and second combustion chamber 102 are arranged sequentially in a fluid flow connection. Fuel can be introduced into the first burner 112 via a first fuel injection 123, mixed with compressed air which is compressed in the compressor 103, and combusted in the first combustion chamber 101. Dilution gas is admixed in the subsequent mixer 117. Additional fuel can be introduced into the second burner via a second, fuel injection 124, mixed with hot gases leaving the mixer 117, and combusted in the second combustion chamber 102. The hot gases leaving the second combustion chamber 102 are expanded in the subsequent turbine 105, performing work. The turbine 105 and compressor 103 are arranged on a shaft 106.

The remaining heat of the exhaust gas 107 leaving the turbine 105 can be further used in a heat recovery steam generator or boiler (not shown) for steam generation.

In the example shown here compressor exit gas is admixed as dilution gas. Typically compressor exit gas is compressed ambient air. For gas turbines with flue gas recirculation (not shown) the compressor exit gas is a mixture of ambient air and recirculated flue gas.

Typically, the gas turbine system includes a generator (not shown) which is coupled to a shaft 106 of the gas turbine 100.

Figures 1C, 2C:
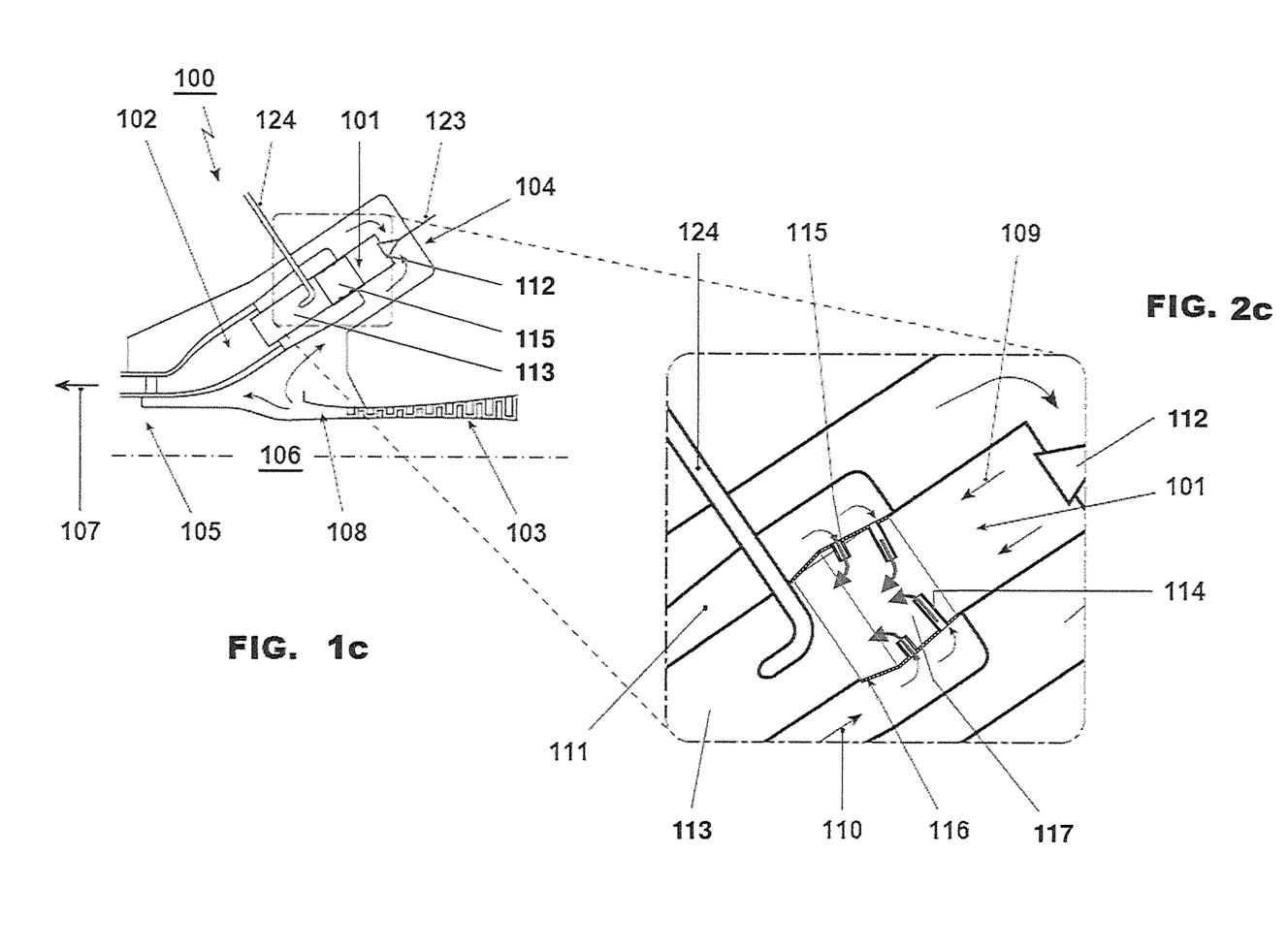
Figure 1D:
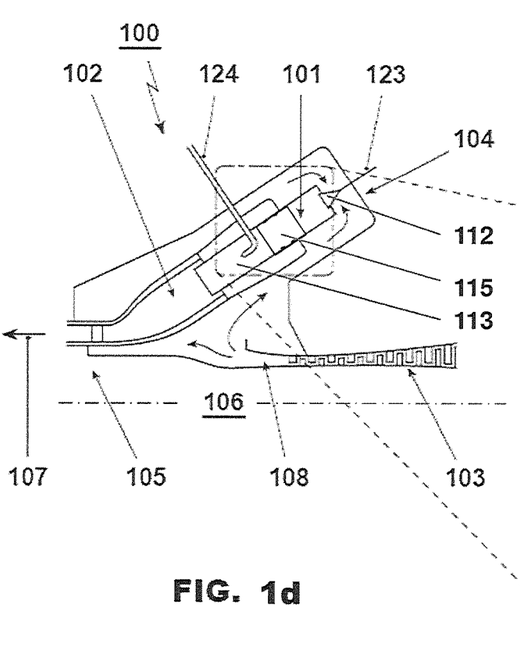
Figure 2A:
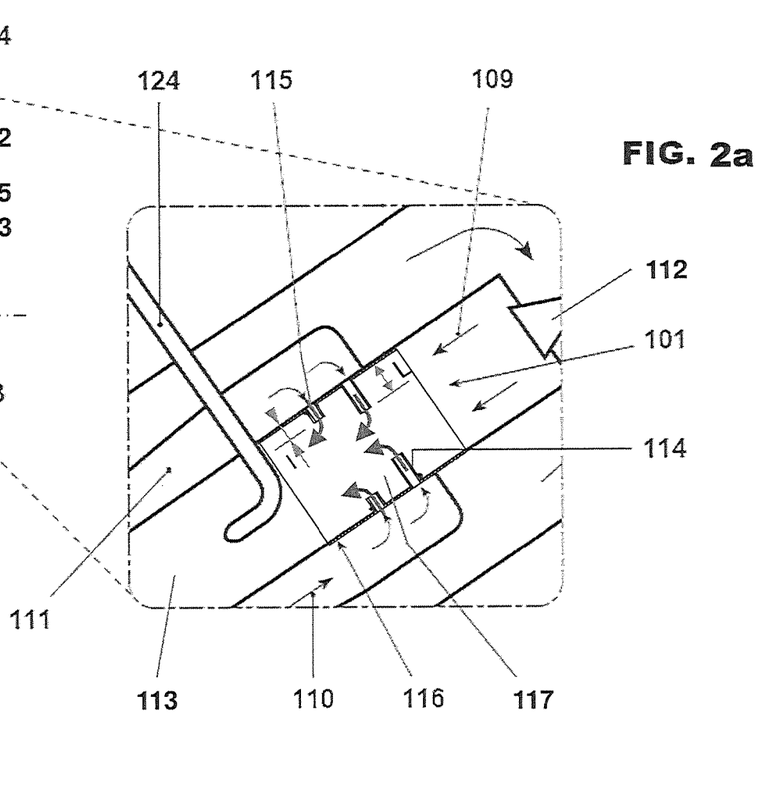
FIG. 2a shows a mixer with first and second injection pipes.

Different exemplary embodiments of the mixer 117 are shown in FIGS. 2a to 2d as an enlarged section of the FIGS. 1a to 1d. FIG. 2a shows a first example with a mixer comprising first injection pipes 114 with a length L and second injection pipes 115 with a length l arranged downstream of the first injection pipes 114. In this example compressed gas from the compressor plenum is guided along combustor liner in a connection duct 111 as dilution gas 110. From the connection duct 111 the dilution gas 110 is injected into the mixer via the first injection pipes 114 and second injection pipes 115. The mixer 117 has a cross section with a height H.

The mixer can be arranged with an annular cross section. For an annular mixer the height H is the difference between the diameter of an outer wall of the annular flow section and the inner wall of the annular flow section. For a mixer with a cylindrical cross section (can-like mixer arrangement) the height H is the diameter of the cross section. The height L of the first injection pipes 114 and the height l of the second injection pipes 115 are chosen such that good mixing of injected dilution gas 110 with the hot gas leaving the first combustion chamber 101 is assured.

Figure 2B:
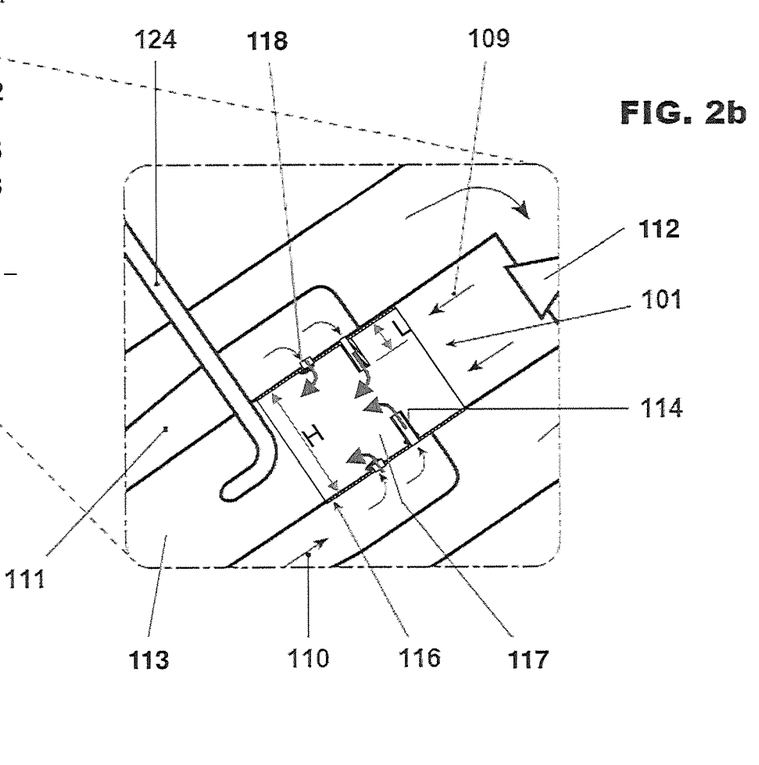
FIG. 2b shows a mixer with first injection pipes and injection holes.

FIG. 2*b* shows an example with a mixer 117 comprising first injection pipes 114 with a length L and injection holes 118. The second injection pipes 115 of FIG. 2*a* are replaced by injection holes 118. The use of injection holes can reduce the pressure drop of the hot gas flow in the mixer 117. It can for example be used if the height H is small enough to allow good mixing with admixing of dilution gas through the first injection pipes 114 with a length L and injection holes 118.

FIG. 2*c* shows another example with a mixer comprising first injection pipes 114 with a length L and second injection pipes 115 with a length l arranged downstream of the first injection pipes 114. To reduce the pressure loss in the hot gas flow the mixer is arranged with diverging side walls 116 in the region of the mixer where dilution gas is admixed. Due to the diverging side walls 116 the cross section of the mixer is increasing like in a diffusor. This increase in cross section leads to a reduction in the flow velocity and a reduction of the pressure drop caused by the first injection pipes 114 and second injection pipes 115. Further it reduces the pressure drop induced by injection dilution gas into the hot gas flow.

Figure 2D:
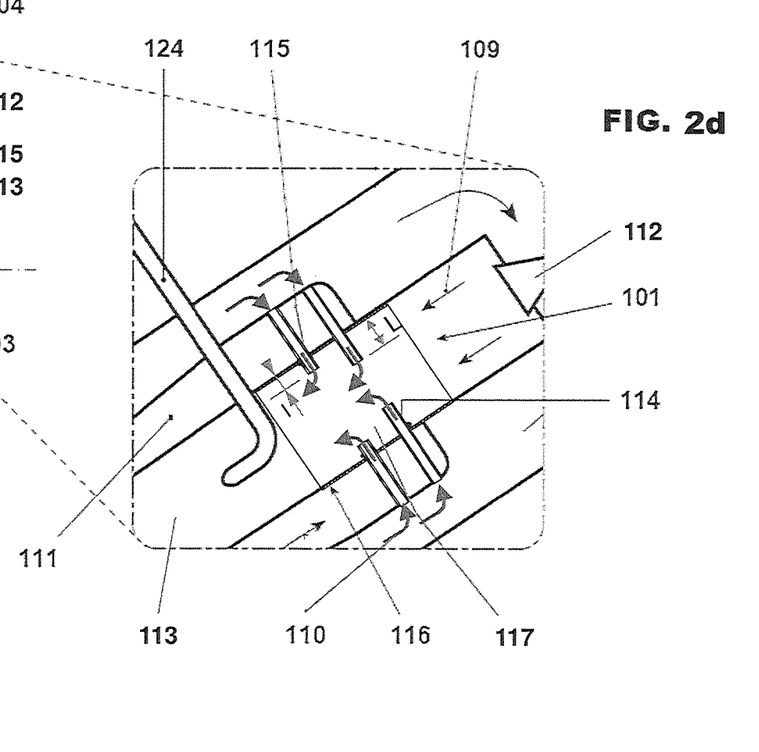
FIG. 2d shows a mixer with first and second injection pipes and direct dilution gas supply from the compressor plenum.

FIG. 2*d* shows example which is based on the example of FIG. 2*a*. In this example the dilution gas 110 is directly supplied to the first injection pipes 114 and second injection pipes 115 from the compressor plenum (downstream of the compressor 103). The first injection pipes 114 and second injection pipes 115 are extending into the compressor plenum and therefore dilution gas 110 with a higher pressure and lower temperature (no temperature pick-up due to the cooling of the combustor before use as dilution gas) is available.

FIG. 3 shows a wall section of a mixer 117 with inclined first and second injection pipes 114, 115. The first and second injection pipes 114, 115 are inclined in the direction of the hot gas flow to reduce the pressure drop of the first and second injection pipes 114, 115. Preferably the inclination has an angle such that the dilution gas leaving the pipes have an axial flow component $v_{d,ax}$ in the direction of the hot gas flow at the location of injection, which is equal to the flow velocity $v_{hot}$ of the hot gas. The dilution gas leaves the injection pipe 114, 115 with a velocity of dilution gas $v_d$. This has the component in direction of the hot gas flow with an axial velocity of dilution gas $v_{d,ax}$ and a flow component normal to the hot gas flow which has a velocity of dilution gas normal to the hot gas flow $v_{d,n}$. The velocity of dilution gas normal to the hot gas flow $v_{d,n}$ facilitates penetration of the dilution gas into the hot gas flow and mixing with the hot gas flow.

Figure 3A:
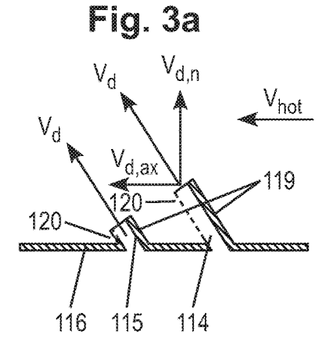
FIG. 3 shows a wall section of a mixer with first and second injection pipes inclined in the direction of the hot gas flow.
Figure 3B:
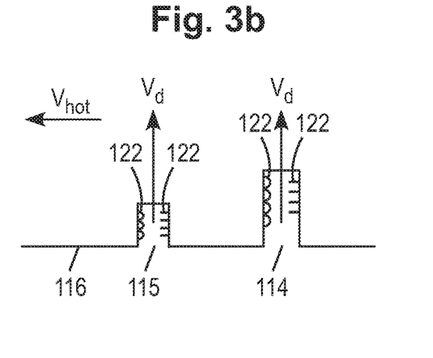

In the example of FIG. 3*a* a thermal barrier coating (TBC) 119 is applied to the upstream side of the injection pipes 114, 115 to reduce their temperature. The TBC can be applied for example on a section of the upstream half or around the whole injection pipe 114, 115. In addition cooling holes 120 are applied on the downstream side. Besides cooling the pipe wall the cooling air ejected from these cooling holes 120 is injected into the wake of the injection pipes 114, 115 and thereby reduces the pressured drop in the hot gas flow. In another example, FIG. 3*b* illustrates cooling ribs and/or a pin field 122 can be arranged on the inner surface of the injection pipes for increased heat transfer.

Figure 4:
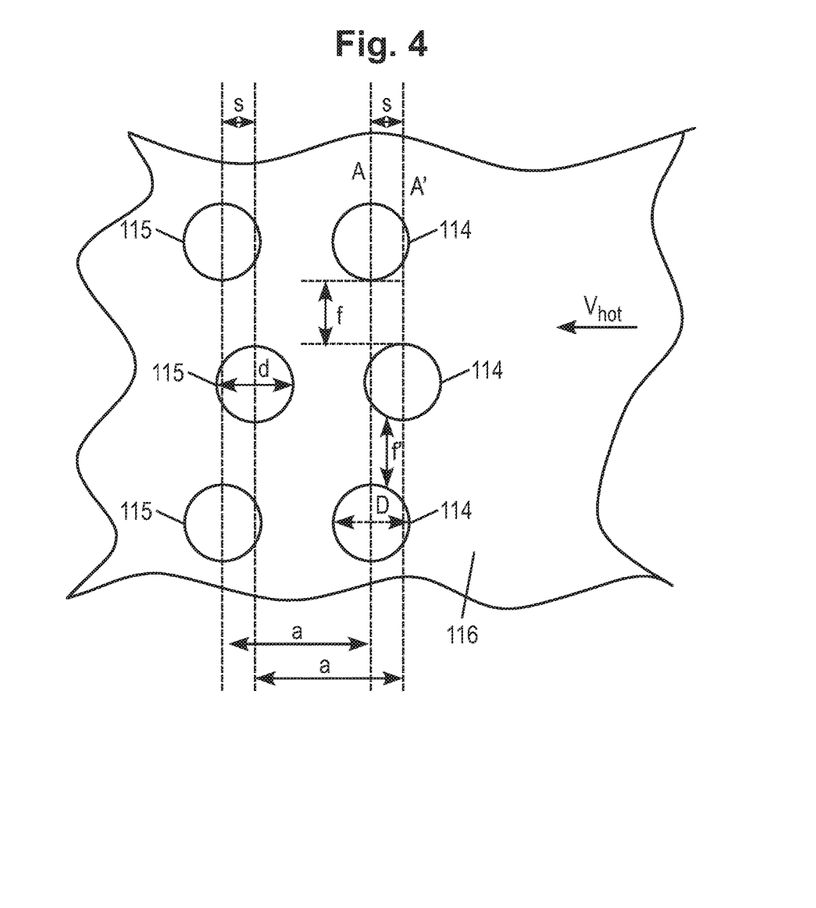
FIG. 4 shows a section of mixer side wall with staggered first and second injection pipes.

FIG. 4 shows a top view of cut-out section the side wall 116 of a mixer 117 with staggered first and second injection pipes 114, 115 having a diameter D. The first injection pipes are arranged in a plane A respectively a plane A' which is normal to the flow direction of the hot gases. The first injection pipes are staggered by a stagger s, i.e. the plane A is arranged at a distance s in flow direction relative to the plane A'. Due to the stagger the free distance f' between two adjacent first injection pipes 114 is increased compared to the free distance f between two adjacent injection pipes which are not staggered.

The second injection pipes 115 are arranged with the same stagger s downstream of the first injection pipes 114 with a distance a between first and a second injection pipes 114, 115. In the example shown the diameter d of the second injection pipes 115 is equal to the diameter D of the first injection pipes 114.

Figure 5:
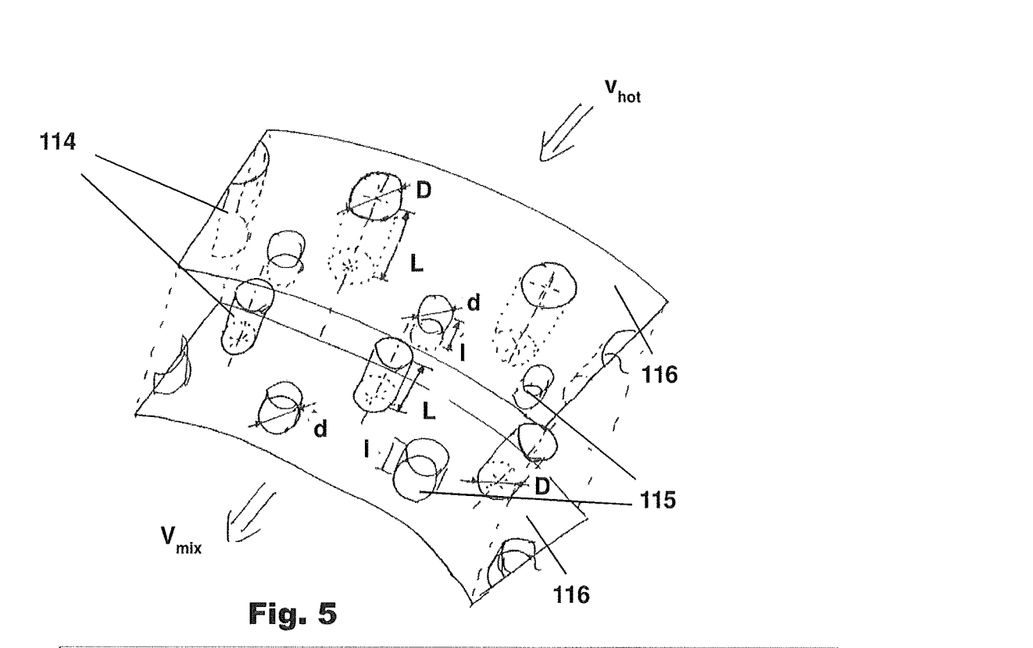
FIG. 5 shows a section of mixer in an annular architecture with first and second injection pipes arranged on inner and outer side walls.

FIG. 5 shows an example of a section of mixer 117 in an annular architecture. First and second injection pipes 114, 115 are arranged on inner and outer side walls 116, which are arranged concentrically with an annular hot gas flow path in-between. Hot gases are flowing into the mixer 117 with a velocity of the hot gas $v_{hot}$. The resulting mixed gas is leaving the mixer 117 with a velocity of the mixed gas $v_{mix}$.

Admixing via injection pipes from only one annular side wall 116 is also feasible, e.g. from the outer side wall (not shown). This can facilitate supply of dilution gas to the injection pipes.

Figure 6:
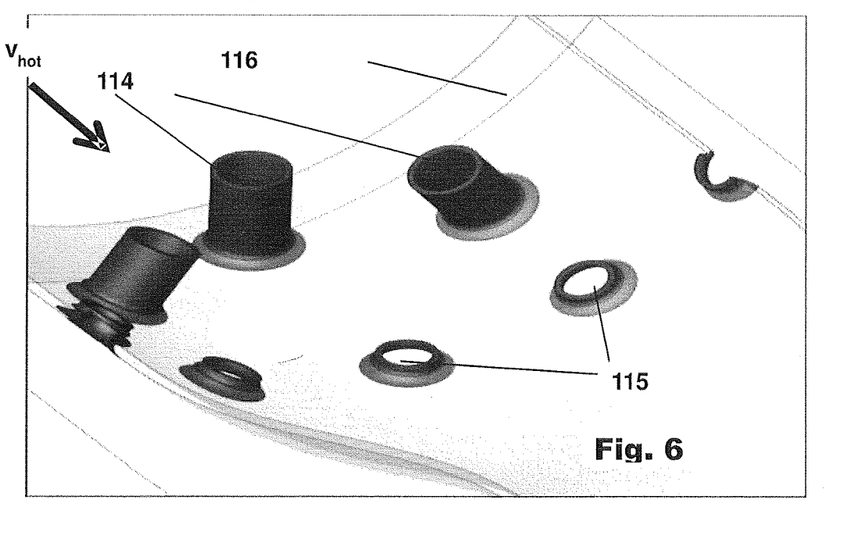
FIG. 6 shows a section of mixer in a can architecture with first and second injection pipes arranged on a cylindrical wall.

FIG. 6 shows an example of a section of mixer in a can architecture. FIG. 6 shows a cut-out of a cylindrical side wall 116. First and second injection pipes 114, 115 are arranged on the cylindrical wall 116. The second injection pipes 115 are arranged downstream of the first injection pipes 114 in the direction of the hot gas flow velocity $v_{hot}$. The inlet to the first and second injection pipe 114, 115 is rounded to reduce the pressure loss of the dilution gas entering the injection pipe 114, 115. The second injection pipe 115 has a length, which is only in the order of two times the radius of the inlet rounding.

The first combustion chamber 101 and the second combustion chamber 102 can be arranged in a combustor can-can-architecture, i.e. the first combustion chamber 101 and second combustion chamber 102 are can combustion chamber.

The first combustion chamber 101 and the second combustion chamber 102 can be arranged in a combustor can-annular-architecture, i.e. the first combustion chamber 101 is arranged as an annular combustion chamber and second combustion chamber 102 is arranged as can combustion chamber.

The first combustion chamber 101 and the second combustion chamber 102 can be arranged in a combustor annular-can-architecture, i.e. the first combustion chamber 101 is arranged as can combustion chamber and second combustion chamber 102 is arranged as an annular combustion chamber.

The first combustion chamber 101 and the second combustion chamber 102 can be arranged in a combustor annular-annular-architecture, i.e. the first combustion chamber 101 and second combustion chamber 102 are annular combustion chambers.

The mixing quality of the mixer 117 is crucial since the burner system of the second combustion chamber 102 requires a prescribed inlet temperature and inlet velocity profile.

All the explained advantages are not limited just to the specified combinations but can also be used in other combinations or alone without departing from the scope of the disclosure. Other possibilities are optionally conceivable, for example, for deactivating individual burners or groups of burners. Further, the dilution gas can be re-cooled in a cooling air cooler before admixing in the mixer 117. Further the arrangement of the injection pipes or injection holes can be reversed, i.e. the short second injection pipes or holes can be arranged upstream of the long first injection pipes. Further, there can be additional pipe types with further pipe length and pipe diameter combinations.

The invention claimed is:

1. A sequential combustor arrangement comprising:
a first burner;
a first combustion chamber;
a mixer for admixing a dilution gas to cool hot gases leaving the first combustion chamber during operation;
a second burner;
a second combustion chamber arranged sequentially in a fluid flow connection; and
a connection duct configured for cooling a liner of the combustor arrangement with dilution gas from a compressor, wherein the connection duct is inside a compressed air plenum formed by an outer casing of the sequential combustor arrangement,
wherein the mixer is adapted to guide combustion gases in a hot gas flow path extending between the first combustion chamber and the second burner, the mixer being formed as a duct having an inlet at an upstream end adapted for connection to the first combustion chamber and an outlet at a downstream end adapted for connection to the second burner,
wherein the mixer includes a plurality of injection pipes pointing inwards from side walls of the mixer for injecting the dilution gas from the connection duct to cool the hot gases leaving the first combustion chamber, and
wherein at least one of the plurality of injection pipes includes a pipe wall having cooling holes on a downstream side and a thermal barrier coating on an upstream side.

2. The combustor arrangement according to claim 1, comprising:
first injection pipes of the plurality of injection pipes, the first injection pipes having a first intrusion depth into the hot gas flow path normal to the side wall of the mixer; and
second injection pipes of the plurality of injection pipes, the second injection pipes having a second intrusion depth into the hot gas flow path normal to the side wall of the mixer, which is smaller than the first intrusion depth.

3. The combustor arrangement according to claim 1, wherein a ratio of a first intrusion depth of a first injection pipe of the plurality of injection pipes to a second intrusion depth of a second injection pipe of the plurality of injection pipes is at least greater than 2.

4. The combustor arrangement according to claim 1, wherein a ratio of equivalent diameter of a cross section of the hot gas flow path at a location of first injection pipes of the plurality of injection pipes in the mixer to a length of the first injection pipes is in a range of at least 2.5 to 8.

5. The combustor arrangement according to claim 1, wherein a ratio of a length of a second injection pipe of the plurality of injection pipes to a diameter of the second injection pipe is smaller than 1/4.

6. The combustor arrangement according to claim 1, wherein second injection pipes of the plurality of injection pipes or injection holes are arranged downstream of first injection pipes of the plurality of injection pipes to compensate for a wake of the first injection pipes and/or in that the second injection pipes or injection holes are arranged upstream of the first injection pipes to reduce axial flow velocities of the hot gas flow before the first injection pipes.

7. The combustor arrangement according to claim 1, wherein a distance in flow direction between at least one first injection pipe and at least one second injection pipe is less than three times a diameter of the at least one first injection pipe.

8. The combustor arrangement according to claim 1, wherein first or second injection pipes of the plurality of injection pipes of one length are arranged circumferentially distributed along the side wall of the mixer in one plane normal to a main flow direction of the hot gases flowing through the mixer or the first or second injection pipes are arranged circumferentially distributed along the side wall of the mixer and staggered relative to a plane normal to the main flow direction of the hot gases flowing through the mixer to reduce flow blockage due to the first or second injection pipes wherein the stagger is less than half a diameter of the first or second injection pipe.

9. The combustor arrangement according to claim 1, comprising:
cooling ribs and/or a pin field arranged on an inner surface of at least one injection pipe of the plurality of injection pipes.

10. The combustor arrangement according to claim 1, wherein the thermal barrier coating is applied on an outer surface of the at least one of the plurality of injection pipes and the cooling holes are diffusion cooling holes.

11. The combustor arrangement according to claim 1, wherein the mixer comprises a diffusor section upstream of the dilution air admixing to reduce a flow velocity of the hot gases, and/or in that the mixer comprises a diffusor section in a region of the dilution air admixing to increase a flow area with a same ratio as volume flow increases due to the admixing of the dilution air to keep an average axial flow velocity constant and/or to limit an increase in the average axial velocity to plus 20% of the axial velocity upstream of an admixing location.

12. The combustor arrangement according to claim 1, wherein at least one injection pipe of the plurality of injection pipes is inclined at an angle of less than 90° relative to a flow direction of the hot gases such that the dilution gas leaving the at least one injection pipe has a flow component in a direction of the hot gas flow at the location of injection.

13. A method for operating a gas turbine with at least a compressor, a combustor arrangement comprising a first burner, a first combustion chamber, a mixer for admixing a dilution gas to the hot gases leaving the first combustion chamber during operation, a second burner connected to an outlet of the mixer at a downstream end for connection to the second burner, a second combustion chamber arranged sequentially in a fluid flow connection, a connection duct configured for cooling a liner of the combustor arrangement with dilution gas from a compressor, and a turbine, wherein the connection duct is inside a compressed air plenum formed by an outer casing of the combustor arrangement, wherein the mixer includes a plurality of injection pipes pointing inwards from the side walls of a duct, and wherein at least one of the plurality of injection pipes includes a pipe wall having cooling holes, the method comprising:
guiding, via the mixer, combustion gases in a hot gas flow path extending between the first combustion chamber and the second combustion chamber;
injecting the dilution gas from the connection duct via the plurality of injection pipes to cool hot flue gases leaving the first combustion chamber, wherein the dilution gas is admixed into different regions of the cross section of the mixer; and transferring heat from the pipe wall via a thermal barrier coating applied on an upstream side of the pipe wall and reducing a pressure drop in a hot gas flow via the cooling holes provided on a downstream side of the pipe wall.

14. The method as claimed in claim 13, comprising:

injecting dilution gas through injection holes and/or second injection pipes of the plurality of injection pipes and first injection pipes of the plurality of injection pipes in order to introduce the dilution gas into different regions of the cross section of the mixer.

\* \* \* \* \*